Feb. 2, 1932.　　　H. D. HOEKSTRA　　　1,843,364
AIRCRAFT TRUSS SUPPORT

Filed April 9, 1930

INVENTOR.
Harold D. Hoekstra
BY
ATTORNEY.

Patented Feb. 2, 1932

1,843,364

UNITED STATES PATENT OFFICE

HAROLD D. HOEKSTRA, OF GLENDALE, OHIO, ASSIGNOR TO POWEL CROSLEY, JR., OF CINCINNATI, OHIO

AIRCRAFT TRUSS SUPPORT

Application filed April 9, 1930. Serial No. 442,839.

My invention relates to aircraft truss supports, and particularly to internal truss supports for the airplane wings.

In airplane construction, such, for example, as is described in United States Patent No. 1,390,216, it has been customary to provide fittings with narrowed ends adapted to fit in slots of turn buckle connections for receiving diagonal truss rods which extend across between the ends of the transverse trusses or tubes and the longitudinal braces. I find that such construction requires a number of different parts and fittings, and when several dozens of these combination fittings are required for each airplane, the expense for these fittings alone is considerable.

It is the object of my invention to provide a truss joint or fitting which will be simple to manufacture, which will be strong and sturdy, and which will be considerably less expensive than the fittings which have, to the best of my knowledge and belief, heretofore been used. Another object of my invention is to provide truss supports which will be more rigid than the supports which have heretofore been used.

The above objects and other objects to which reference will be made in the ensuing disclosure, I accomplish by that certain combination and arrangement of parts of which I have illustrated a preferred modification.

In the drawings:—

Figure 1:
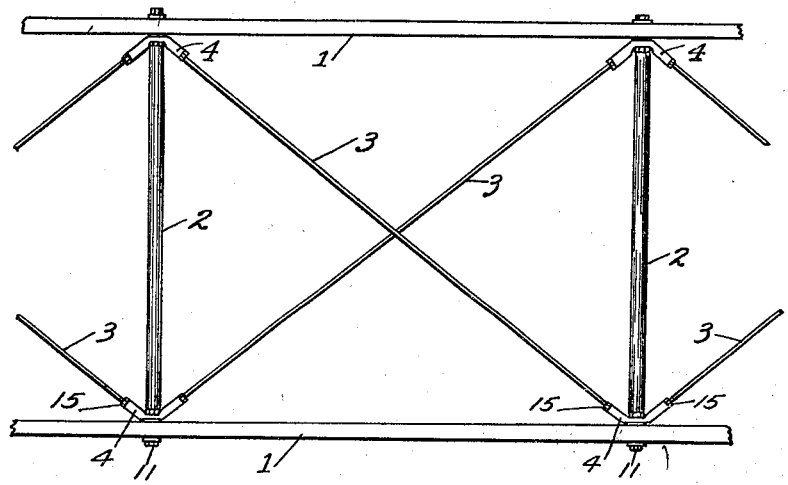
Figure 1 is a plan view of a portion of an aircraft truss.
Figure 2:
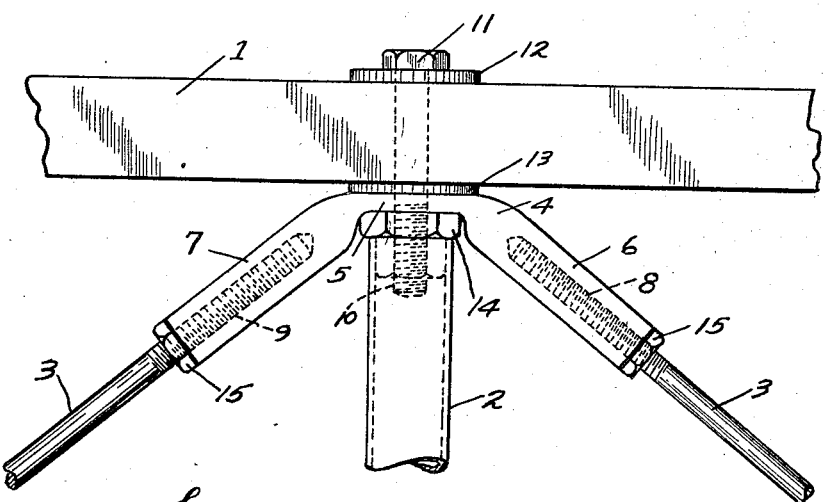
Figure 2 is an enlarged detail (plan view) of a truss joint made in accordance with my invention.

A preferred wing construction for an airplane has longitudinally extending spars 1 with transverse, tubular or bar compression members 2 extending at right angles to the longitudinal supports. Diagonally extending trusses 3 extend from the joints of the spars and transverse compression members.

I provide a fitting 4 having a flattened portion 5, and having arms 6 and 7 which are internally threaded as indicated at 3, 9, respectively, extending from the flattened portion. The transverse supporting bars 2 are internally threaded as indicated at 10 and a bolt 11 extends transversely through the longitudinal support, and its threaded end is engaged in threads 10 of the member 2.

In the construction illustrated, I have shown washers 12 and 13, the former underneath the head of the bolt 11, and the latter between the longitudinal support and the flattened portion 5 of the fitting 4. I may further employ a nut 14 engaging the threads of the bolt 11 between the flattened portion of the fitting and the end of the transverse tubular member 2. The diagonally extending tie rods 3 are threaded on their opposed ends with right and left hand threads, so that when the trusses are turned they will form a stout brace extending between the fittings at the opposed ends of alternate series of transverse supports.

In order to tighten the transverse trusses, all that is necessary is to turn these tie rods with a wrench and when they are securely fastened and aligned nuts 15 may be used to bind them securely in position.

It will be apparent that the fittings 4 form a much more rigid support for the diagonal truss rods than would be formed with separate angular fittings having pin slot connections with turn buckle sockets.

Further, the avoidance of pin fittings provides a truss assembly which is held much more rigidly against distortion from the plane in which the longitudinal, transverse and diagonal braces extend.

Having thus described my invention, what I claim as new and desire to secure by Letters Patent, is:—

An aircraft truss supporting member comprising an integral coupling member having a flattened area for attachment between a longitudinal and a transverse truss, said member having threaded ends extending obliquely for the reception of the threaded ends of diagonal tie rods, said coupling member having an aperture extending through the flattened area thereof for the passage of a bolt securing said longitudinal trusses and transverse rods together.

HAROLD D. HOEKSTRA.